(12) United States Patent
Tomaru et al.

(10) Patent No.: US 8,292,746 B2
(45) Date of Patent: Oct. 23, 2012

(54) GAME SYSTEM AND SERVER

(75) Inventors: Hiroshi Tomaru, Tokyo (JP); Takuya Ando, Tokyo (JP); Kazuhiro Yoshida, Tokyo (JP); Yaku Hiranabe, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 245 days.

(21) Appl. No.: 12/678,760

(22) PCT Filed: Aug. 22, 2008

(86) PCT No.: PCT/JP2008/065023
§ 371 (c)(1),
(2), (4) Date: Mar. 18, 2010

(87) PCT Pub. No.: WO2009/041198
PCT Pub. Date: Apr. 2, 2009

(65) Prior Publication Data
US 2010/0261535 A1  Oct. 14, 2010

(30) Foreign Application Priority Data
Sep. 28, 2007  (JP) .................. 2007-256892

(51) Int. Cl.
*A63F 13/00* (2006.01)
(52) U.S. Cl. .................. 463/59; 463/6; 463/23; 463/42; 463/58; 273/246; 273/317.1; 273/445; 472/86; 700/90; 700/91
(58) Field of Classification Search .............. 463/6–7, 463/20, 22–23, 30–34, 36–37, 42–43, 58–69; 273/246, 248–252, 258, 317.1, 359, 366–368, 273/441–446, 454–455, 460–461; 434/29, 434/61–71; 446/7; 472/86, 95, 130; 700/90–93
See application file for complete search history.

(56) References Cited

U.S. PATENT DOCUMENTS
5,263,715 A * 11/1993 Matsumoto et al. ............ 463/22
(Continued)

FOREIGN PATENT DOCUMENTS
JP    08-000829 A    1/1996
(Continued)

OTHER PUBLICATIONS
International Search Report for PCT/JP2008/065023 (Nov. 18, 2008).
(Continued)

*Primary Examiner* — Arthur O. Hall
(74) *Attorney, Agent, or Firm* — Edwards Wildman Palmer LLP; Peter C. Schechter; Brian R. Landry

(57) ABSTRACT

A game system for reliably realizing synchronization of timings at which a common event in a plurality of game machines start. The game system includes a plan management server that measures lapse of system time common in the game system and with the time measurement, updates plan information indicative of remaining time until the system time reaches a process start stage at which a process for the common event starts. Each of the game machines includes an obtaining device to obtain the plan information from the plan management server, a stage determining device to determine whether the system time has reached the process start stage or not on the basis of laps of time of the system time measured in the game machine, and a process executing device to start a process for the common event when it is determined that the system time has reached the process start stage.

14 Claims, 9 Drawing Sheets

U.S. PATENT DOCUMENTS

| | | | |
|---|---|---|---|
| 5,720,663 A * | 2/1998 | Nakatani et al. | 463/23 |
| 6,203,433 B1 | 3/2001 | Kume | |
| 6,346,048 B1 | 2/2002 | Ogawa et al. | |
| 6,390,922 B1 | 5/2002 | Vange et al. | |
| 6,884,163 B2 * | 4/2005 | Namba et al. | 463/1 |
| 7,674,167 B2 * | 3/2010 | Ohta | 463/6 |
| 7,805,151 B2 * | 9/2010 | Feeney et al. | 455/466 |
| 7,854,657 B2 * | 12/2010 | Shiraiwa | 463/42 |
| 7,871,322 B2 * | 1/2011 | Yoshinobu et al. | 463/9 |
| 7,946,910 B2 * | 5/2011 | Feeney et al. | 463/9 |
| 8,002,630 B2 * | 8/2011 | Nguyen et al. | 463/25 |
| 8,070,606 B2 * | 12/2011 | Rowan et al. | 463/42 |
| 2003/0104868 A1 * | 6/2003 | Okita et al. | 463/42 |
| 2003/0233445 A1 * | 12/2003 | Levy et al. | 709/224 |
| 2005/0255923 A1 * | 11/2005 | Aoki | 463/43 |
| 2006/0068915 A1 * | 3/2006 | Okada | 463/42 |
| 2007/0202953 A1 * | 8/2007 | Taninami | 463/42 |

FOREIGN PATENT DOCUMENTS

| | | |
|---|---|---|
| JP | 2003-225469 A | 8/2003 |
| JP | 2007-209628 A | 8/2007 |
| JP | 2007-215767 A | 8/2007 |
| WO | 2006/118451 A1 | 11/2006 |
| WO | 2007/070155 A2 | 6/2007 |

OTHER PUBLICATIONS

Extended European Search Report for European Application No. 08 83 4591 dated Mar. 30, 2011.

* cited by examiner

GAME SYSTEM AND SERVER

RELATED APPLICATIONS

This is the U.S. National Phase Application under 35 U.S.C. §371 of International Patent Application Serial No. PCT/JP2008/065023, filed Aug. 22, 2008, which claims the benefit of Japanese Patent Application Serial No. 2007-256892, filed Sep. 28, 2007, both of which are entirely incorporated by reference herein. The International Application was published in Japanese on Apr. 2, 2009 as WO/2009/041198 A1 under PCT Article 21(2).

TECHNICAL FIELD

The present invention relates to a game system in which a common event is performed in a plurality of game machines via a communication line, and a server provided for the game system.

BACKGROUND ART

A system in which, for example, a common game is performed at least once in a predetermined period as a common event performed in a plurality of game machines capable of transmitting/receiving data via a communication line is well known (refer to, for example, Patent Document 1).
Patent Document 1: Japanese Unexamined Patent Application Publication No. 2003-225469

DISCLOSURE OF THE INVENTION

Problem to be Solved by the Invention

However, in a conventional game system, lapse time in a game space is managed on a game machine unit basis, so that time lag tends to occur among the game machines. For example, in the case where game time is measured by using power-on of a game machine as a trigger, time in a game world elapses continuously from game time at the moment of power-off. Consequently, when the timings of power-on vary, a lag between game times each of which corresponds to each game machine gradually increases and it becomes difficult to achieve synchronization among the game machines.

An object of the present invention is therefore to provide a game system reliably realizing synchronization of timings of starting processes on a common event performed in each of the game machines in a case where the common event is performed concurrently in the plurality of game machines, and a server provided for the game system.

Means for Solving the Problem

A game system according to the present invention solves the above problem by being constructed as a game system in which a common event to be concurrently performed in a plurality of game machines each capable of transmitting/receiving data via a communication line is performed at least once in a predetermined period, comprising: a plan management server including: a server time measuring device to measure lapse of system time common in the game system; a plan information storing device to store plan information indicative of remaining time until the system time reaches a process start stage at which a process for each of the common events starts; a plan information updating device to update the plan information in accordance with measurement by the server time measuring device; and a plan information providing device to provide the plan information to the game machine in response to a plan information request from each of the game machines, wherein each of the game machines includes: an obtaining device to transmit, when a predetermined condition is satisfied, the plan information request to the plan management server and obtain the plan information; a game machine time measuring device to start, when the plan information is obtained by the obtaining device, measuring lapse of the system time; a stage determining device to determine whether the system time has reached the process start stage or not based on the time measured by the game machine time measuring device and the remaining time indicated by the obtained plan information; and a process executing device to start, when the stage determining device determines that the system time has reached the process start stage, the process for the common event.

According to the game system of the present invention, the plan information indicative of remaining time until the system time reaches the process start stage at which a process for a common event starts is updated in the system time by the plan information updating device of the plan management server, and provided to the game machine by the plan information providing device. In the game machine which obtains the plan information, the remaining time in the plan information is continuously measured by the game machine time measuring device. When the stage determining device determines that the system time has reached the process start stage, the process for the common event is started by the process executing device. In this manner, the system time common in the game system is measured in each of the plan management server and the game machine. Each of the game machines starts the process for the common event in accordance with the remaining time of the plan information obtained from the plan management server. Since the plan information is information common in the game system, the process for the common event is started concurrently at each of the game machines in the game system.

Therefore, the synchronization of timings of starting the process for the common event in the game system can be reliably realized. Moreover, by storing information associated in accordance with a specific kind of common event and a remaining time thereof in each of game machines, with a process other than the process for the common event, by referring to the kind of the common event and the remaining time in the plan information, synchronization can be achieved in the game system also in processes other than the process for the common event.

The "common event" includes a game concurrently played by a plurality of game machines and an event which is not related to a game such as questionnaires or advertisements. The "process for a common event" is a concept including a preparing process necessary to execute the common event and a process necessary to execute the common event itself. The "plan information indicative of remaining time" includes a case that the remaining time itself is the plan information and a case that the remaining time is obtained by using a predetermined formula or information to the plan information. The server time measuring device and the game machine time measuring device that measures the system time are devices that measures flow of time common in the game system (the system time). Both cases are included, one case that they measure the same time as that of a general clock, and another case that they measure time different from that of a general clock are included.

The obtaining device may transmit, when the predetermined condition is satisfied in a case where the game machine is powered on, the plan information request, and obtain the plan information. Thereby, by using the power-on of the game machine as a trigger, the plan information can be obtained. Therefore, the system time in the game machine from the moment of power-on can be adjusted to the system time common in the game system.

The plan information providing device of the plan management server may provide to the game machine, the plan information on a plurality of common events to be executed during a predetermined time since a moment of receiving the plan information request. Thereby, even in the case where a common event is performed frequently and a number of pieces of plan information are stored in the plan information storing device, only a part of the plan information, for example, only the plan information of the current day on which the plan information request is received or the plan information according to open time of a store can be provided to a game machine.

The common event may be a process for the common game to be performed concurrently by the plurality of game machines. Thereby, it is possible to achieve the synchronization of the processes for the common game in the game system. Each of the game machines may be configured such that only a common game is executed or a game using no communication line can be also executed.

the game machine may have an after-start stage storing device to store stage information on time required to reach each of a plurality of stages indicating progress of process for the common game after the system time has reached the process start stage, and the stage determining device of the game machine may determine whether or not the system time has reached any one of the stages indicating the progress of process by referring to time measured by the game machine time measuring device and the stage information after the system time may have reached the process start stage, and the process executing device of the game machine may perform the process for the common game associated with the stage which is determined as a reached stage by the stage determining device.

Thereby, after the system time reaches the process start stage to start the process for the common game, each of the stages indicated by the stage information and time required to reach each of the stages are referred by the stage determining device. When the system time reaches any one of the stages, a process according to each of the stages is executed. Accordingly, after the process for the common game starts, also for each stage in the progress of the process, the synchronization in the game system can be achieved.

the plan information in the plan information storing device may include stage information on time required to reach to each of a plurality of stages indicating progress for the common game after the system time has reached the process start stage, the stage determining device of the game machine may determine whether or not the system time has reached any one of the stages in the progress of process by referring to time measured by the game machine time measuring device and the stage information after the system time has reached the process start stage, and the process executing device of the game machine may perform the process for the common game associated with the stage which is determined as a reached stage by the stage determining device.

Thereby, after the system time reaches the process start stage to start the process for the common game, each of the stages indicated by the stage information and time required to reach each of the stages are referred by the stage determining device. When the system time reaches any one of the stages, a process according to each of the stages is executed. Accordingly, after the process for the common game starts, also for each stage indicating the progress of the process, the synchronization in the game system can be achieved. In addition, according to the present invention, in the stage information included in the plan information of each common game, if the stage to be set and the required time corresponding to the stage are set to be different depending on the kind of the common game, it is possible to realize a progress of process for the common game, the process being different depending on the kind of the common game.

The game system may further comprise a lobby server that accepts participation requests for participating in the common game from the game machines, sets one of the game machines which sent the participation request as a game master of the common game, and transmits to the game machines, a participation acceptance notification including master information indicative of the game master, wherein the plurality of stages indicating the progress of process for the common game may include a reception end stage at which reception of the participation request is finished, a participation determination stage at which participation game machines to participate in the common game are determined, and an execution stage of the common game, the process executing device of the game machine may include: a participation requesting device, when it is determined that the system time has reached the process start stage, in a case where a participation request operation is performed by a player within predetermined time, to enable the participation request to be transmitted to the lobby server and, when it is determined that the system time has reached the participation request end stage, to disable transmission of the participation request; a master determining device to determine whether the game machine itself is the game master or not by referring to the master information received from the lobby master; a registration requesting device to transmit, when the master determining device determines that the game machine itself is not the game master, a registration request for registering the game machine itself to a game machine which is set as the game master; a participation game machine registering device to receive, in a case where the master determining device determines that the game machine itself is the game master, the registration request from a game machine which is not the game master, register into participation information, a game machine corresponding to the received registration request as the participation game machine, and when the system time reaches the participation determining stage, and stop reception of the registration request to transmit the participation information to the game machines corresponding to the received registration request; and a game executing device, when it is determined that the system time has reached the execution stage, to start executing the common game with other game machines registered in the registration information. Thereby, the present invention can provide the game system allowing, within the game machines included in the game system, only a part of game machines which sent the participation requests to participate in the common game.

The common game to be executed at least once in the predetermined period may be a game corresponding to an actual horse race held in one year.

A server according to the present invention solves the above problem by being constructed as a server included in a game system in which a process for a common event concurrently performed in a plurality of game machines each capable of transmitting/receiving data via a communication line is performed at least once in a predetermined period, comprising: a server time measuring device to measure lapse of system time common in the game system; plan information storing device that stores plan information indicative of remaining time until the system time reaches a process start stage at which a process for each of the common events starts; a plan information updating device to update the plan information in accordance with measurement by the server time measuring device; and a plan information providing device to provide the plan information to the game machine in response to a plan information request from each of the game machines. The server of the present invention functions as the plan management server in the game system of the present invention. Accordingly, the meaning of the devices of the server is the same as described above.

Effect of the Invention

As described above, the present invention can provide a game system and a server reliably realizing the synchronization of timings of starting a process for the common event in game machines. The game system includes a plan management server that measures lapse of system time common in the game system and, in accordance with the measured time, updates the plan information indicative of remaining time until the system time reaches a process start stage in which allows a process for the common event to start. Each of the game machines determines whether the system time has reached the process start stage of the process for the common event or not on the basis of the remaining time indicated by the plan information obtained from the plan management server and the lapse of the system time. When it is determined that the system time has reached the process start stage, the process for the common event is started.

BEST MODE FOR CARRYING OUT THE INVENTION

Figure 1:
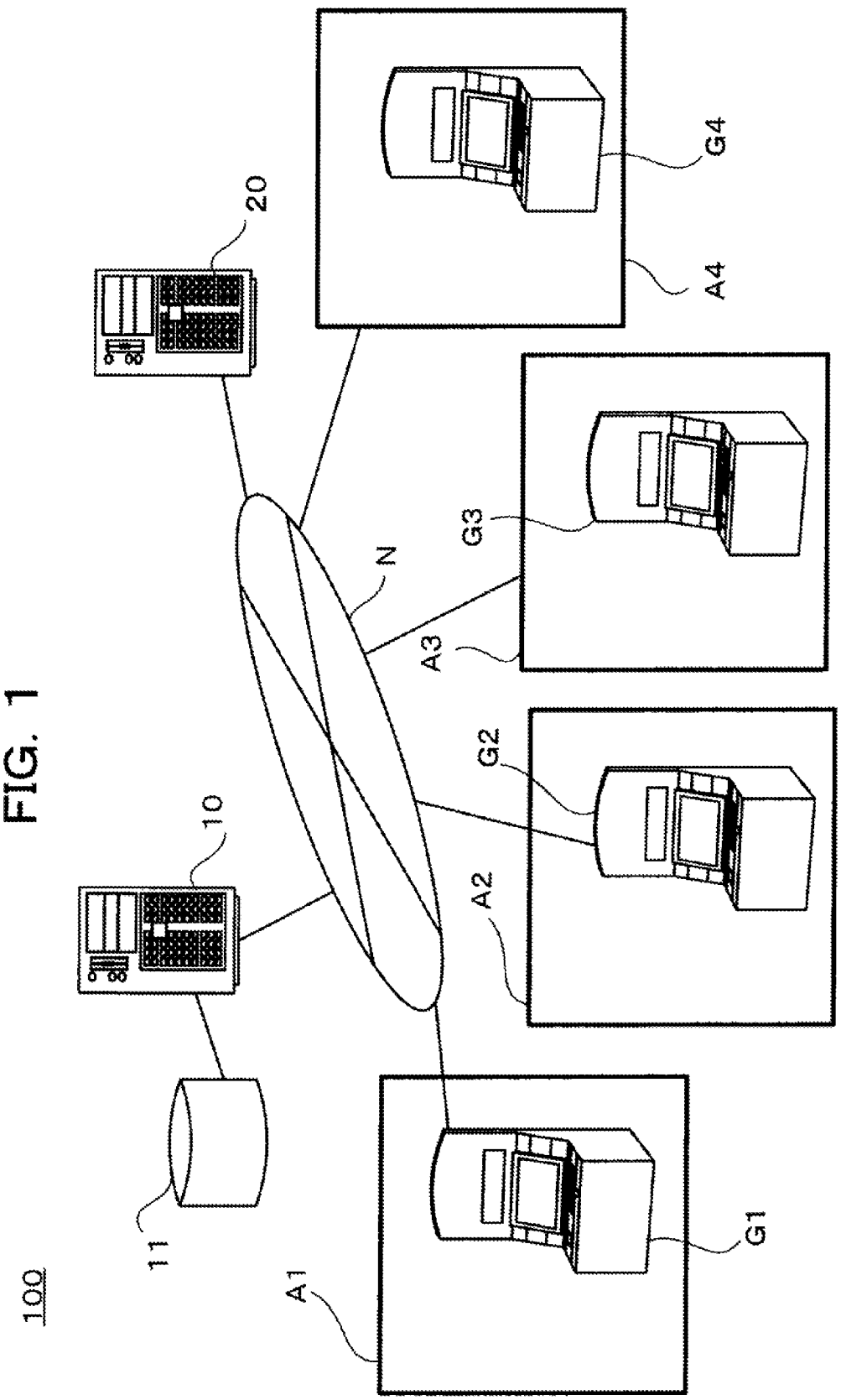
FIG. 1 is a diagram showing an example of a game system of the present invention.

FIG. 1 shows an example of a game system 100 of the present invention. The game system 100 includes a main server 10, a lobby server 20, and game machines G1 to G4. The servers 10 and 20 and the game machines G1 to G4 can transmit/receive data to/from each other via a network N. The main server 10 has a server storage 11 in which data related to a game provided by the game system 100 is stored. The game machines G1, G2, G3, and G4 have the same configuration and are game machines for business mounted in stores A1, A2, A3, and A4, respectively.

When the game machines G1, G2, G3, and G4 do not have to be discriminated from one another, they are called "game machines G". When the stores A1, A2, A3, and A4 do not have to be discriminated from one another, they are called "stores A". A plurality of game machines G may be mounted in each store A. For example, two game machines G1 and G2 may be mounted in a single store A. A communication connecting method in the game system 100 may be that of a conventionally-known network-type game system.

A game provided by the game system 100 is a horse race game in which the player makes a virtual horse grown up by the player (hereinafter, called "player's horses") participate in a horse race and run for competition. Each game machine G provides not only horse race games played in a single game machine but also a common game played in itself concurrently with game machines G mounted in different stores A via a network N. In the embodiment, a plurality of races associated with actual horse races such as the Kikuka Sho, the Arima Kinen and the like are provided as the common games. The common games are performed according to a schedule of one year which is set in advance.

In what follows, a horse race other than the common games provided by the game machine G is called a local game. The local games include, for example, a game of raising a player's horse and a game to be played with virtual horses prepared by the game machine G. In each of the common games of the present embodiment, the game machines G are grouped by the abilities of horses to run, and the common game is executed for each group.

Figure 2:
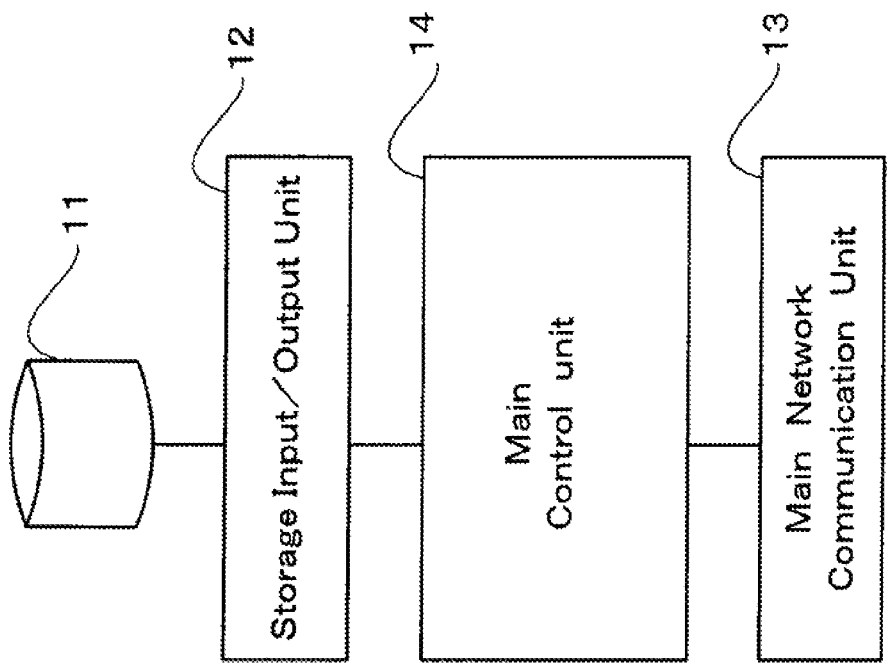
FIG. 2 is a hardware configuration diagram of a main server in the game system shown in FIG. 1.

The main server 10 functions as a plan management server, manages information stored in the server storage 11, and provides information according to a request from the game machine G. The hardware configuration of the main server 10 includes, as shown in FIG. 2, the server storage 11 in which data to be provided to the game machines G is stored, a storage input/output unit 12 for executing processes related to input/output of the data stored in the server storage 11, a main network communication unit 13 executing processes related to communication via the network N, and a main control unit 14 for controlling operations of the main server 10 including the units 12 and 13.

The main control unit 14 is constructed as a computer having a CPU and various storage areas such as a RAM and a ROM necessary for the operation of the CPU, and serves as, mainly, a server time measuring device, a plan information updating device, and a plan information providing device. Information stored by the server storage 11 as a plan information storing device will be described later. The server time measuring device is a device for measuring lapse of system time as time common in the game system 100. In what follows, the server time measuring device will be called a "server timer". Hours and time indicated in the following specification are hours and time in the system time.

The lobby server 20 accepts an entry request for participation in the common game from each of the game machines and groups the game machines G which sent the entry requests on the basis of a predetermined criterion. The game machine G whose entry request was received firstly in the group is determined as a game master. The game master is a game machine G to manage the progress in the common game in the group. In what follows, the game machine G determined as the game master is sometimes called a "game master G", and the game machine G other than the game master is sometimes called a "slaves G".

Figure 3:
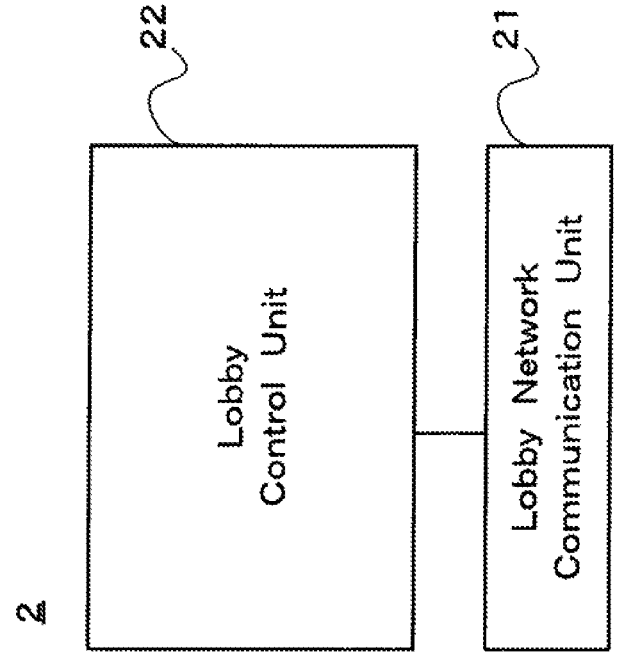
FIG. 3 is a hardware configuration diagram of a lobby server in the game system shown in FIG. 1.

The hardware configuration of the lobby server 20 may be the configuration of a conventionally known lobby server. For example, as shown in FIG. 3, the lobby server 20 is constructed by a network communication unit 21 to execute processes related to communication via the network N, and a lobby control unit 22 to control operation of the lobby server 20 including the lobby network communication unit 21. The lobby control unit 22 is constructed as a computer having a CPU and various storage areas such as a RAM and a ROM necessary for the operation of the CPU.

Figure 4:
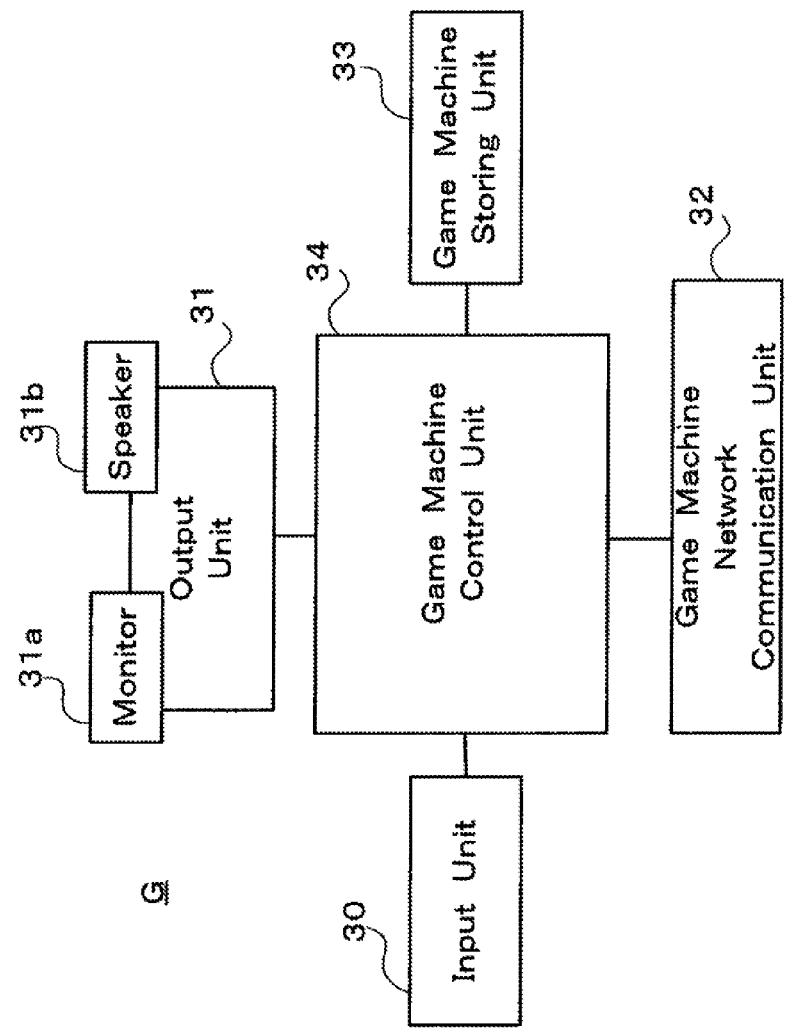
FIG. 4 is a hardware configuration diagram of a game machine in the game system shown in FIG. 1.

The game machine G accepts operations of a player and provides the local game or the common game to the player. The hardware configuration of the game machine G includes, as shown in FIG. 4, an input unit 30 to include buttons and keys that accept various operations of the player, an output unit 31 to perform a process of displaying a game screen and various messages on a monitor 31*a* and a process of outputting sound effect from a speaker 31*b*, a game machine network communication unit 32 to execute a process with respect to communication with the network N, a game machine storing unit 33 to store various information, and a game machine control unit 34 to control the operation of the game machine G including the units 30, 31, 32, and 33.

The game machine control unit 34 is constructed as a computer having a CPU and various storage areas such as a RAM, a ROM, and the like necessary for the operation of the CPU, and functions mainly an obtaining device, a game machine time measuring device, a stage determining device, and a process executing device. The game machine time measuring device is a device for measuring lapse of the system time in the game system 100 like the server timer means. In what follows, the game machine time measuring device will be called a "game machine timer". Information stored in the game machine storing unit 33 as an after-start stage storing device will be described later.

Figure 5A:
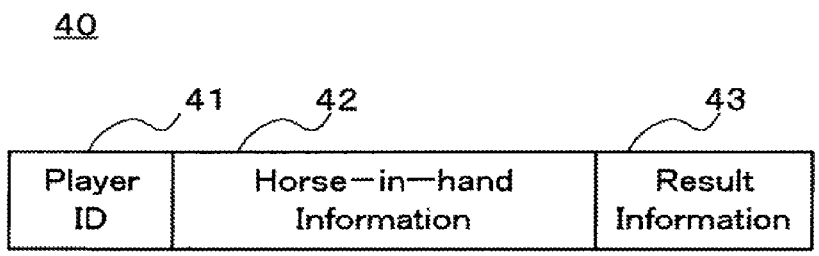
FIG. 5A is a diagram showing an example of player information.

Information stored in the server storage 11 will be described. In the server storage 11, player information 40 related to the player and schedule information 50 related to a schedule on which the common game are executed is stored. The server storage 11 functions as a plan information storing device by storing the schedule information 50. The player information 40 is constructed by, as shown in FIG. 5A, a player ID 41 as identification information on a player, horse-in-hand information 42 as information on a horse in hand of the player, and result information 43 indicative of a result of a game of the player. In the horse-in-hand information 42, horse information is set for each of horses owned by players. In the horse information, a horse ID identifying the horse, appearance and age information of the horse, various parameter values indicative of abilities of the horse, game results of the horse, and the like are associated with each other. The result information 43 is information on a game skill of the player based on the results of past games of the player.

Figure 5B:
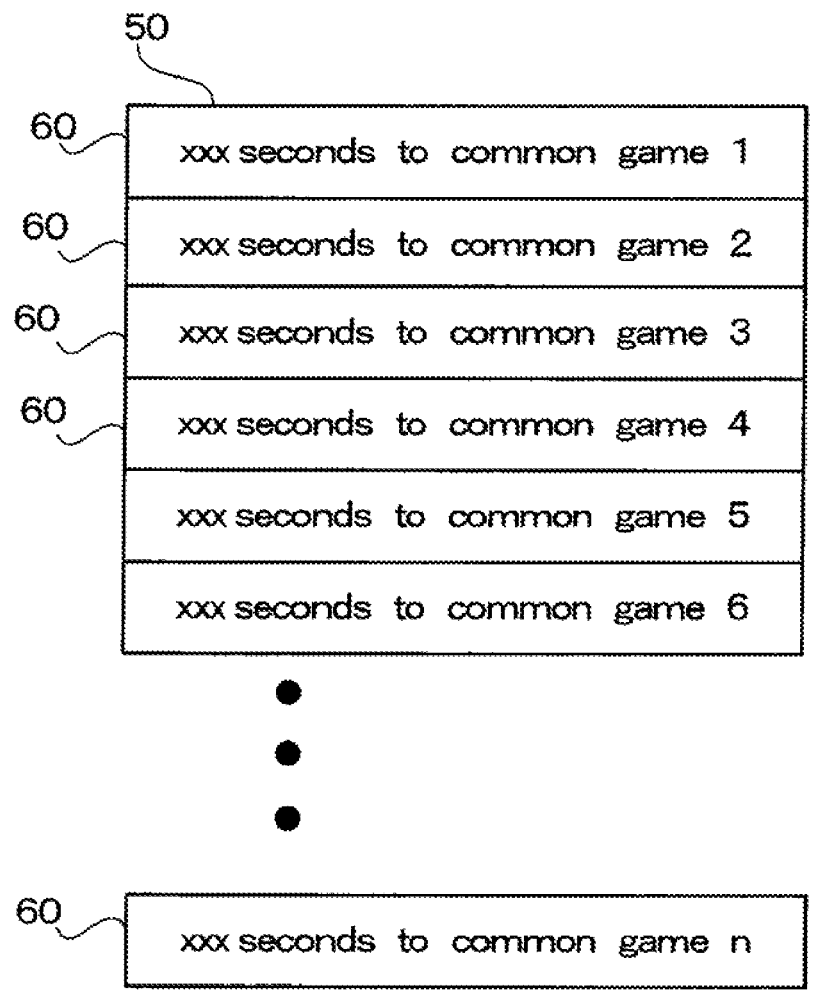
FIG. 5B is a diagram showing an example of plan information.

The schedule information 50 will be described using FIG. 5B. The schedule information 50 on the present embodiment is constructed by plan information 60 on each of a plurality of common games held in one year. The schedule information 50 shown in FIG. 5B is constructed by n pieces of plan information 60 from a common game 1 to a common game n. For example, in the case where the common game are held 60 times in one year, the schedule information 50 is constructed by 60 pieces of plan information 60. In the plan information 60, for each common game, remaining time of system time to a process start stage to start a process for the common game is set. For example, it is also possible to set the remaining time to only the plan information 60 on the common game held in a predetermined time (for example, one day), and set date and time to be held to the plan information 60 on the other common games.

Figure 6:
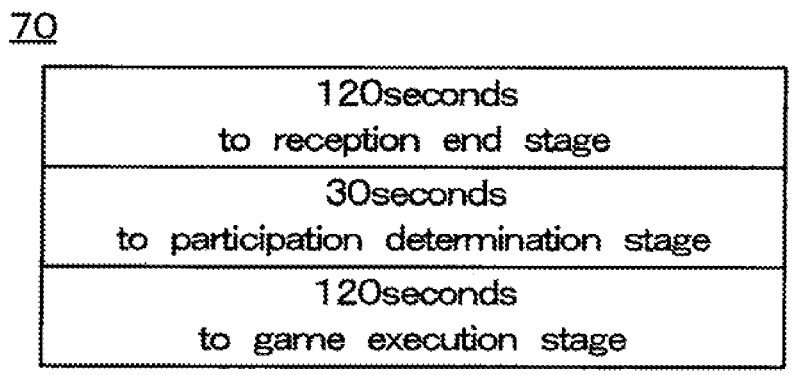
FIG. 6 is a diagram showing an example of stage information.

Stage information 70 stored in the game machine storing unit 33 as an after-start stage storing device will be described. In the stage information 70, as shown in FIG. 6, required time to reach each of a plurality of stages indicating the progress of process for the common game is set. It is sufficient to properly set each required time in consideration of time taken to execute a process until each stage. In the present embodiment, as a plurality of stages indicating the progress of process for the common game, "a reception end stage", "a participation determination stage", and "a game execution stage" are set.

The "reception end stage" is a stage at which the entry request from the game machine cannot be made. "120 seconds until the reception end stage" indicates that 120 seconds is set as time required to reach the reception end stage after the process start stage. The "participation determination stage" indicates a stage at which the game machines to participate in the common game is determined. "30 seconds to the participation determination stage" indicates that 30 seconds is set as the time required to reach the participation determination stage after the reception end stage has been reached. The "game execution stage" indicates a stage at which a horse race game as the common game starts in each of the game machines. "120 seconds until game execution stage" indicates that 120 seconds is set as time required to reach the game execution stage after the participation determination stage. The stage information 70 is common in each of the common games. That is, processes for each of the common games are arranged time homogeneously.

Figure 7:
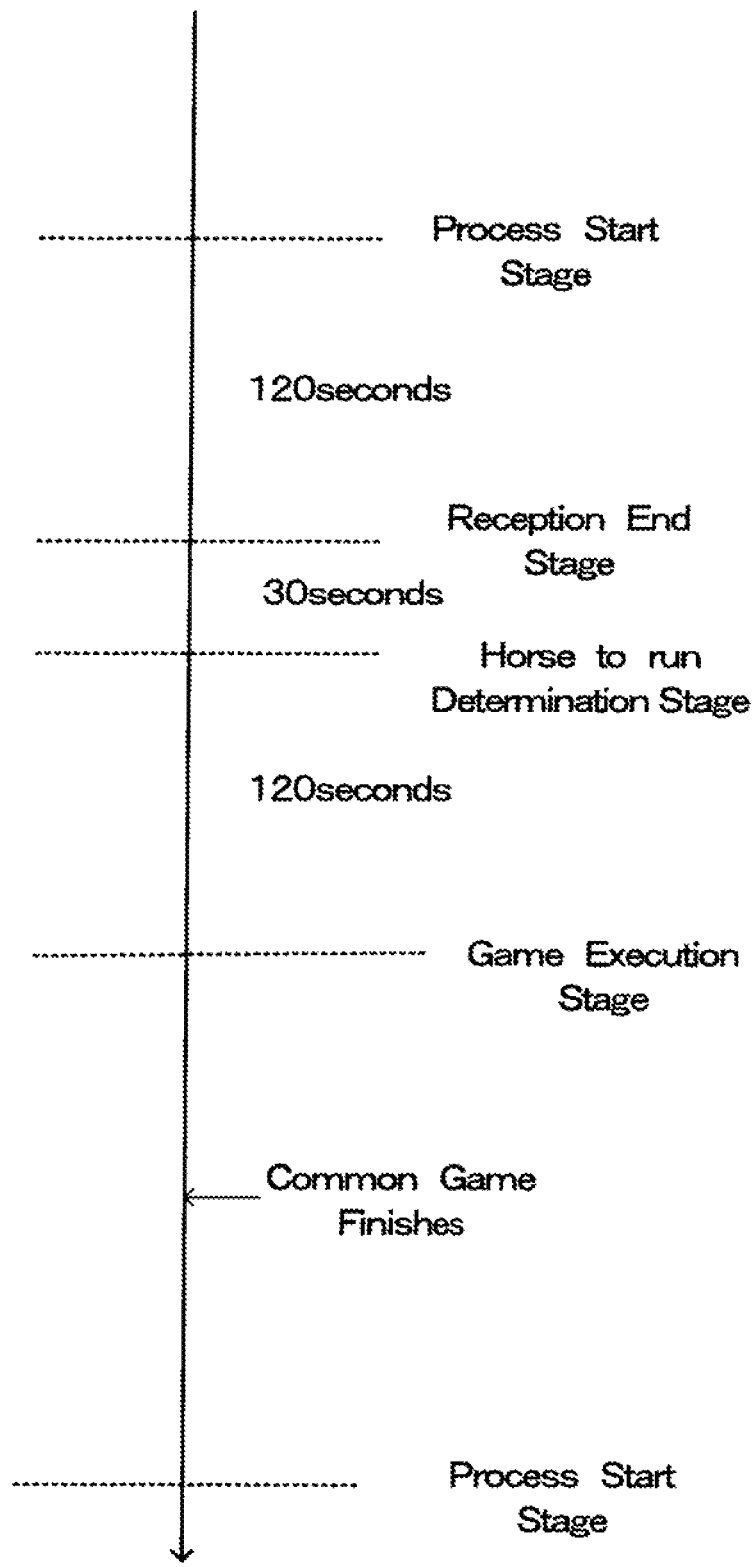
FIG. 7 is a diagram showing a plurality of stages indicating the progress of process for a common game.

The process for the common game is executed on the basis of the above-described plan information 60 and the stage information 70. The game machine control unit 34 as a stage determining device determines whether the system time has reached the process start stage of the common game or not by referring to the plan information 60 and, after reaching the process start stage, the game machine control unit 34 determines whether the system time has reached each of the stages or not by referring to the stage information 70. Since the above-described plan information 60 and stage information 70 is common information in the game system 100, the timing of starting the process for the common game and the timing of reaching each of the stages indicating the progress of subsequent process can be adjusted as shown in FIG. 7 in the game system GS.

In the game system GS, the system time reaches the process start stage in accordance with the remaining time of the plan information 60. Subsequently, after elapsing each required time indicated in the stage information 70, the system time reaches a reception end stage, a horse to run determination stage, and a game execution stage respectively. After that, in accordance with the remaining time of the plan information 60 on the next common game, the system time comes into the process start stage again.

Figure 8:
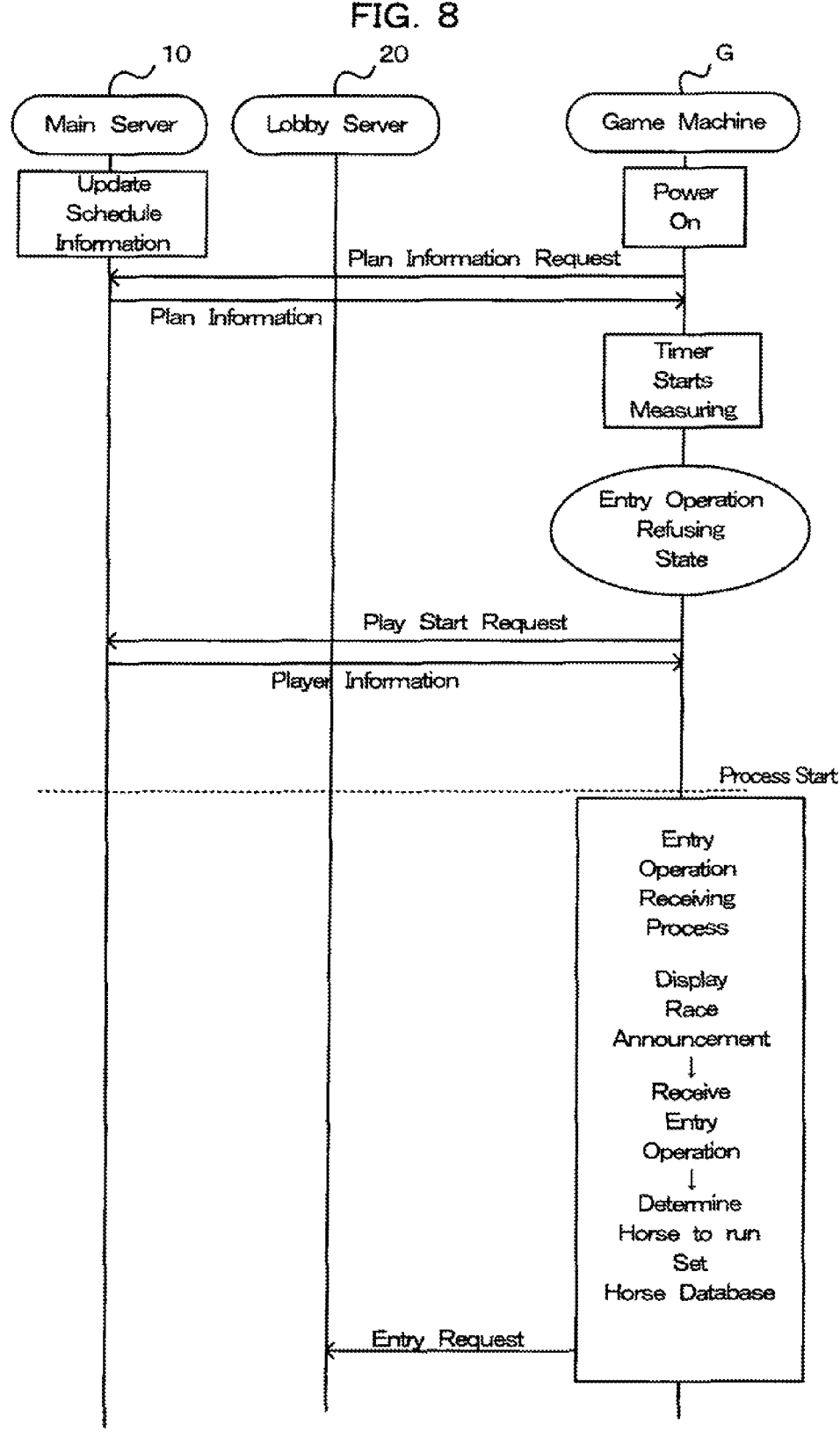
FIG. 8 is a sequence chart showing a flow of processes until an entry request is transmitted, which are executed in each server and each game machine.
Figure 9:
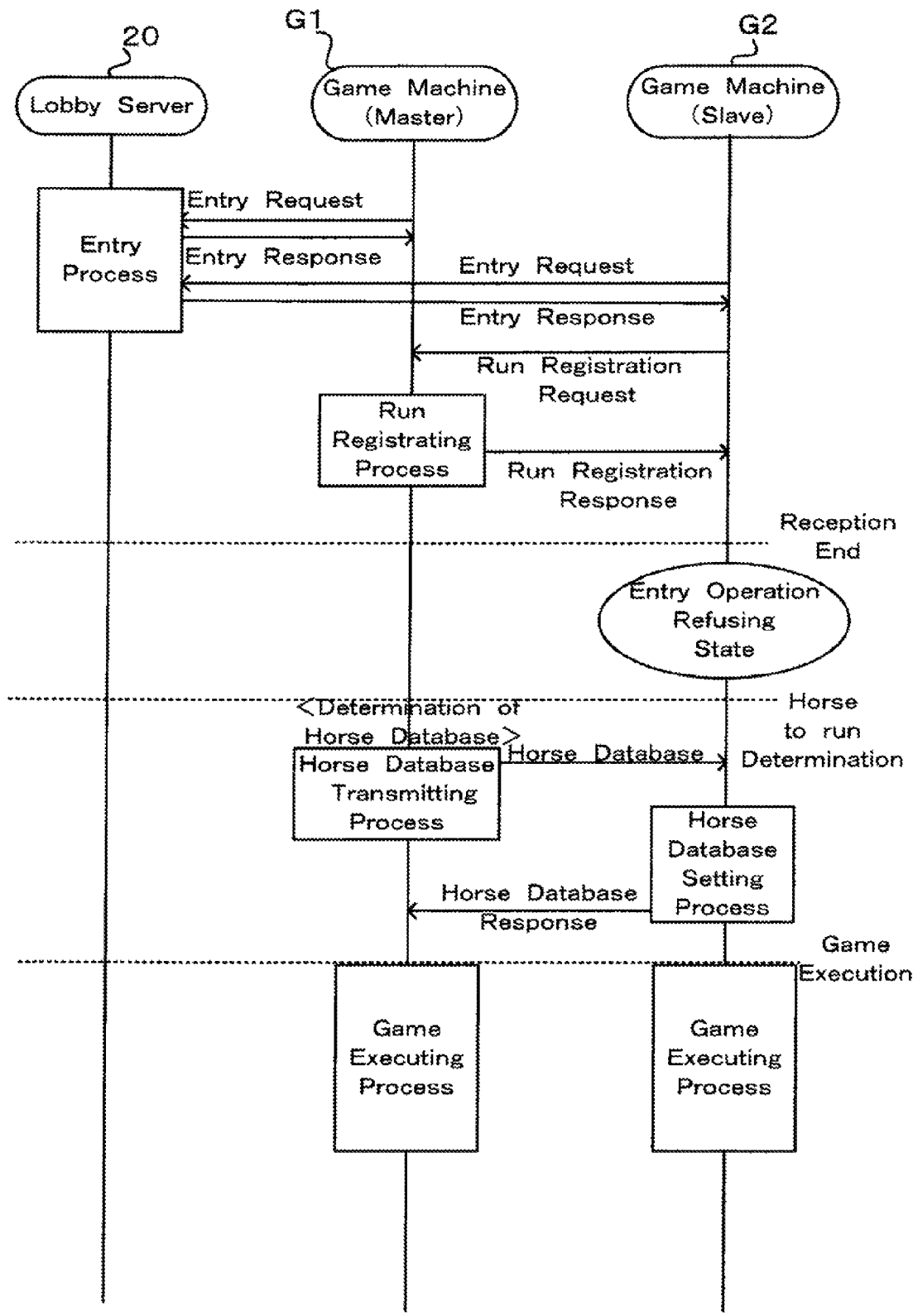
FIG. 9 is a sequence chart showing a flow of processes after transmission of the entry request, which are executed in each server and each game machine.

In the case where a player P1 operating the game machine G1, a player P2 operating the game machine G2, a player P3 operating the game machine G3, and a player P4 operating the game machine G4 participate in the common game, a flow of processes executed in each of the main server 10, the lobby server 20, and the game machine G will be concretely described with reference to FIGS. 8 and 9. In what follows, when each of the players P1 to P4 does not have to be discriminated, each of them will be called a player P. The process in the main server 10 is controlled by the main control unit 14, the process in the lobby server 20 is controlled by the lobby control unit 22, and the control in the game machine G is controlled by the game machine control unit 34.

First, the procedure of processes from power-on of the game machine G to transmission of the entry request will be described using FIG. 8. The procedure of processes until the entry request is transmitted in each of the game machines G is similar. The main control unit 14 of the main server 10 updates the schedule information 50 of the server storage 11 in accordance with time measured by the server timer. Thereby, the main control unit 14 of the main server 10 functions as a plan information updating device. The plan information 60 with no remaining time may be eliminated from the server storage 11. When the power of the game machine G is powered on, the game machine G transmits a plan information request to the main server 10.

The main server 10 which has received the plan information request extracts the plan information 60 of the current day from the schedule information 50 in the server storage 11 and provides it to the game machine G. Thereby, the main control unit 14 of the main server 10 functions as a plan information providing device. The plan information 60 of the current day could be, for example by using a timer of the current day to measure the remaining time of the current day, obtained as the plan information 60 in which the remaining time same as or less than the remaining time indicated by the timer of the current day is set.

The game machine G which has obtained the plan information 60 of the current day starts measuring time by the game machine timer. By referring to the time measured by the game machine timer and the remaining time indicated in the plan information 60 with reference to the common game to be executed next, it is determined whether the system time has reached the start process stage or not with respect to the next common game. In the present embodiment, the case where the time measurement by the game machine timer starts before the start process stage is reached will be described. In what follows, unless otherwise noted, the plan information 60 indicates the plan information 60 with respect to the common game to be executed next in the schedule information 50. Until the system time reaches the start process stage, the game machine G is in a local state. The local state is an entry operation refusing state in which although a local game is provided to the player P, an entry operation by the player P is not accepted.

On the other hand, after the power being turned on, when a predetermined play start operation is performed by the player P, the game machine G transmits a play start request including the player ID of the player P to the main server 10. The main server 10 extracts and provides to the game machine G, the player information 40 of the player P from the server storage 11. The player P who has performed the play start operation can play a local game provided by the game machine G.

After the system time reaches the process start stage, the period until the system time reaches the reception end stage is an entry possible period in which an entry to the common game is allowed. For example, when the system time reaches the process start stage, the game machine G executes the entry operation receiving process. In the entry operation receiving process, a race announcement for urging players to enter the common game is displayed on the monitor 31a, and the game machine G is set in an entry operation acceptable state. As the race announcement, for example, the required time to reach the reception end stage of the stage information 70 is displayed.

When the entry operation is performed by the player P during the entry possible period, the game machine G accepts the entry operation. In the present embodiment, by the entry operation, a horse to run as a horse of the player P in the common game is determined, and horse database (horse information of each horse to participate in the race) in the game machine G is set. When the game machine G receives the entry operation, it transmits an entry request to the lobby server 20. The entry request includes the horse information of the participating horse of the player P. The display of the race announcement is stopped in response to the entry operation of the player P.

In what follows, a flow of processes after the entry request is transmitted from each of the game machines G will be described using FIG. 9. First, the lobby server 20 which has received the entry request from the game machine G executes an entry process. In the entry process, the game machines G are grouped on the basis of the horse information included in the entry requests, and the game machine G from which the entry request is received first for each group is set as a game master in a predetermined storage area. An entry response including master information indicative of the game master is transmitted to the game machines G which transmitted the entry request. An example of a mode of grouping the game machines on the basis of the horse information is a mode of grouping the game machines according to whether the attribute of a horse satisfies a predetermined criterion or not.

In the present embodiment, the case where, by the grouping, the game machines G1 and G2 belong to a group GR1 and the game machines G3 and G4 belong to a group GR2 will be described. Since processes executed in the groups GR1 and GR2 respectively are similar to each other, the group GR1 to which the game machines G1 and G2 belong will be described.

When receiving the entry request from the game machine G1, the lobby server 20 associates the game machine G1 with the group GR1 on the basis of the horse information included in the received entry request. Further, since the game machine G1 is a game machine firstly associated with the group GR1, the lobby server 20 associates the game machine G1 as a game master with the group GR1 and transmits to the game machine G1, an entry response including master information indicating that the game machine G1 is the game master. Next, the lobby server 20 receives the entry request from the game machine G2, associates the game machine G2 with the group GR1 on the basis of the horse information included in the entry request, and transmits to the game machine G2, an entry response including the master information indicating that the game machine G1 is the game master.

The slave G2 which is not the game master transmits a run registration request to the game master G1 indicated in the received master information. The run registration request includes, for example, the horse information of a horse to run in the race and information on the player P2. When receiving the run registration request, the game master G1 executes a run registering process. In the run registering process, the game master G1 sets a horse database for the common game on the basis of the horse information included in the received run registration request, and transmits a run registration response to the slave G2.

When the system time reaches the reception end stage, for example, as the entry operation in the game machine G is refused, the game machine G comes into a state that the player P cannot make an entry. Therefore, when the system time reaches the reception end stage, no entry request is transmitted from a new game machine G. Consequently, after lapse of 30 seconds since the reception end stage, when the system time reaches a run horse determining stage, that causes a state where horses to run in the common game are determined, that is, the horse database for the common game is determined.

When the system time reaches the horse-to-run determining stage, a process with respect to notification of a horse to run is executed by the game start stage. Specifically, a horse database transmitting process is executed in the game master G1, and a horse database setting process is executed in the slave G2. In the horse database transmitting process, the determined horse database is transmitted to the slave G2 which sent the run registration request. In the case where the number of horses to run based on the run registration request is less than the predetermined number necessary for the race, the horse database is replenished with a virtual horse to be provided by the game master G1. In the horse database setting process, the horse database transmitted from the game master G1 is set as the horse database for the common game, and a horse database response is transmitted to the game master G1.

After that, when the system time reaches game start GS to reach the game start stage, each of the game machines G1 and G2 starts a game executing process for executing the common game. In the game executing process, a horse race is executed in the group GR. When the common game is finished, the game machines G1 and G2 comes into a local state until the system time reaches a start process stage with respect to the next common game.

The processes in accordance with each of the stages with respect to the common game are executed in the game machine G in any of group, as long as the game machine G is included in the game system 100. On the other hand, in a game machine G which does not enter the common game, provision of local games is continued.

Figure 10:
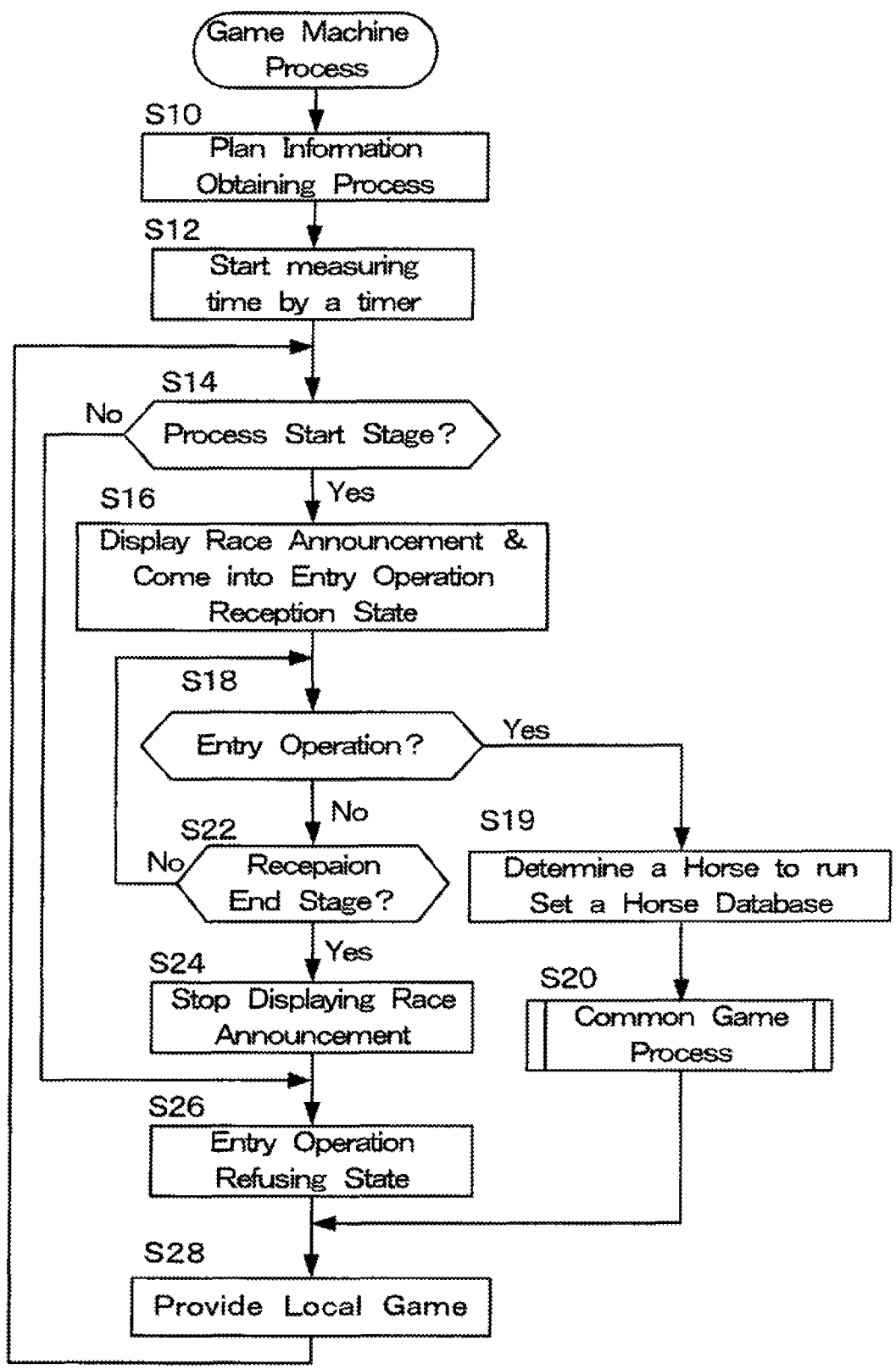
FIG. 10 is a flowchart showing a flow of processes in a game machine process.
Figure 11:
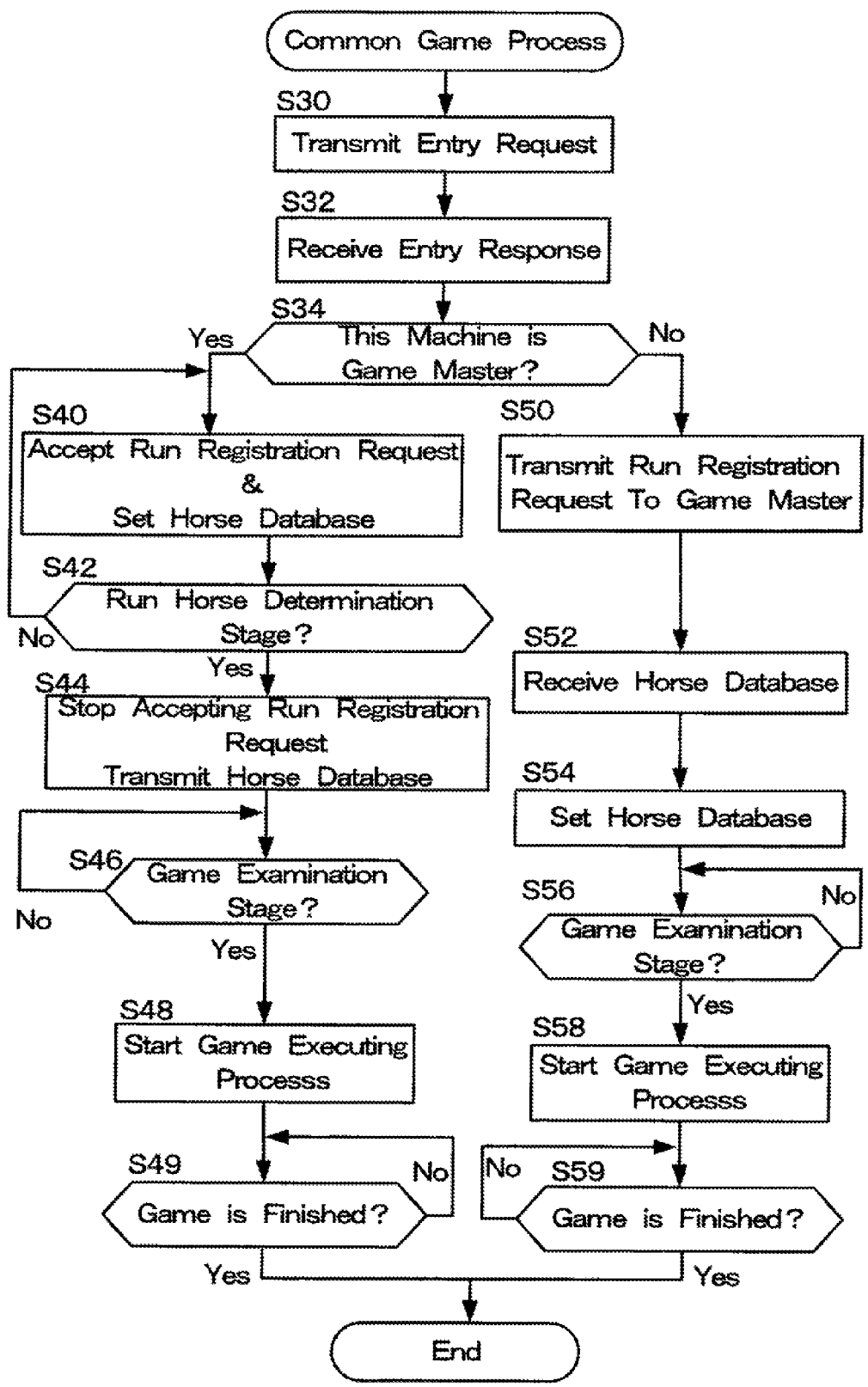
FIG. 11 is a sequence chart showing a flow of processes in a common game process included in the game machine process.

The game machine process executed with respect to the common game in the game machine G after power-on will be described with reference to the flowcharts of FIGS. 10 and 11. Each of the processes in the game machine processes is controlled by the game machine control unit 34 of the game machine G. First, in step S10, a plan information obtaining process is executed. In the plan information obtaining process, in response to the power-on, a plan information request is transmitted to the main server 10, and the plan information 60 of the current day is obtained. After the plan information 60 is obtained from the main server 10, the process advances to step S12 to start measuring time with the game machine timer that measures lapse of the system time. Subsequently, in step S14, whether the system time has reached the process start stage on the common game at present or not is determined. In the case where it is determined that the system time has reached the process start stage, the process advances to step S16, in which a race announcement is displayed on the monitor 31a, and the game machine G is set to an entry-operation acceptable state. For example, it is sufficient to bring buttons and keys to be used for the entry operation into an effective state.

After that, in step S18, whether the entry operation is performed or not is determined. In the entry operation, as described above, a horse to run in a race of a common game is selected as a horse of the player P. Therefore, in the case where it is determined that the entry operation is performed, the process advances to step S19 to set the horse to run in the race of the common game as the horse of the player P and the horse database. Subsequently, the unit advances to step S20 and a common game process of progressing a process for participation of a common game is performed. The common game process will be described later. In the case where it is determined that the entry operation is not performed in step S18, the process advances to step S22 to determine whether the system time has reached the reception end stage or not.

In the case where it is determined in step S22 that the system time has reached the reception end stage, the process advances to step S24 to stop displaying the race announcement. Subsequently, the process advances to step S26 to bring the game machine G into an entry operation refusing state, and execute a process for providing a local game in step S28. To set the entry operation refusing state, for example, it is sufficient to set the buttons and keys to be used for the entry operation into an invalid state. In the case where it is determined in step S22 that the system time has not reached the reception end stage, the process returns to step S18.

On the other hand, when it is determined in step S14 that the system time has not reached the process start stage, the process advances to step S26 to set the game machine G into the entry operation refusing state, and execute a process for providing a local game in step S28. After the common game process in step S20 is finished, the process advances to step S28 to execute a process for providing a local game. In the process for providing a local game in step S28, while progressing this process, the process returns to step S14 to determine whether the system time has reached the process start stage or not. In the game machine G, the above mentioned processes are repeated.

Next, the common game process will be described in accordance with the flowchart of FIG. 11. First, in step S30, the entry request is transmitted to the lobby server 20. The entry request includes the horse information of the horse determined as the horse to run and information on the game machine. Next, in step S32, the entry response is received from the lobby server 20. The entry response includes the master information indicative of the game master G1.

In response to the entry response, the process advances to step S34 to determine whether the game machine itself is the game master G1 or not. In the case where it is determined that the game machine itself is the game master G1, the process advances to step S40. In the case where it is determined that the game machine itself is, not the game master G1, the slave G2, the process advances to step S50. First, the case where the game machine itself is determined as the game master G1 will be described. In step S40, the run registration request from the slave G2 is accepted, on the basis of the horse information included in the run registration request, the horse database for the common game is set. Next, the process advances to step S42 to determine whether the system time has reached the horse-to-run determining stage or not.

In the case where it is determined that the system time has not reached the horse-to-run determining state, the process returns to step S40 to continue the run registration request accepting state. In the case where it is determined that the system time has reached the horse-to-run determining state, the process advances to step S44. In step S44, the reception of the run registration request is stopped and the horse database for the common game is transmitted to the slave G2 which has sent the run registration request. To stop the reception of the run registration request, for example, it is sufficient not to set the horse information of the received run registration request into the horse database.

Subsequently, the process advances to step S46 to determine whether the system time has reached the game execution stage or not. Until it is determined that the system time has reached the game execution stage, the determination state is continued. When it is determined, the process advances to step S48 to execute the game executing process for executing the common game. In step S49, it is determined whether the common game has finished or not. When it is determined that the common game has finished, the common game process is finished.

The processes to be executed in the case where it is determined in step S34 that the game machine itself is the slave G2 will be described. In step S50, the run registration request is transmitted to the game master G1 indicated by the master information. The run registration request includes the horse information of a horse determined as a horse to run and information on the player P2. After that, when the horse database is received from the game master G1 in step S52, the received horse database is set as the horse database for the common game in step S54.

Subsequently, the process advances to step S56 to determine whether the system time has reached the game execution stage or not. The wait state is continued until it is determined that the system time has reached the game execution stage. When it is determined that the system time has reached the game execution stage, the process advances to step S58 to execute the game executing process for executing the common game. In step S59, it is determined whether the common game is finished or not. When it is determined that the common game is finished, the common game process is finished. As the game executing process in steps S48 and S58, it is sufficient to employ a process similar to that of a conventionally known network game system performed between a game master and a slave.

The game machine control unit 34 functions as an obtaining device by step S10, functions as a stage determining device by steps S14, S22, S42, S46, and S56, and functions as a process executing device by the steps S16, S24, and the like. With respect to the devices included in the process executing device, the game machine control unit 34 functions as a participation request device by steps S26 and S30, functions as a master determining device by step S34, functions as a registration requesting device by step S50, functions as a participation game machine registering device by the steps S40 and S44, and functions as a game executing device by the steps S48 and S58.

The present invention is not limited to the foregoing embodiment but can be carried out in various modes. For example, the stage information 70 may be included in each piece of the plan information 60, and the main server 10 may provide it to the game machine G. Thereby, the stage information 70 which varies depending on the kind of a common game can be set. Another configuration is also possible in which the lobby server 20 is not provided, all of the game machines G in the game system GS participate in the common game. In this case, it is unnecessary to provide the lobby server 20 and the game master. For example, the main server 10 may control progress of the common game.

In each game machine, by associating a predetermined process with a specific kind of the common game and the remaining time thereof and providing a monitoring device to monitor the kind of the common game and the remaining time in the plan information, timings of executing even processes other than the common game can be synchronized.

The period of executing the common games included in the schedule information 50 may not be limited to one year. Although the number of game machines G is four in the present embodiment, the number of game machines G included in the game system GS is not limited to four. The main server 10 and the lobby server 20 may be provided as a physically same body. It is also possible to provide a server for inputting/outputting data stored in the server storage 11 separately from the main server 10 so that the main server 10 can access data in the server storage 11 via the network N.

The invention claimed is:

1. A game system in which one or more common events for a common game are concurrently performed in a plurality of game machines each configured to transmitting and receiving data via a communication line, comprising:
   a plan management server including:
   a server time measuring device adapted and configured to measure lapse of system time common in the game system;
   a plan information storing device adapted and configured to store plan information indicative of remaining time until the system time reaches a process start stage at which a process for each of the common events starts;
   a plan information updating device adapted and configured to update the plan information stored by the plan information storing device in accordance with measurement by the server time measuring device; and
   a plan information providing device adapted and configured to provide the plan information to the game machine in response to a plan information request from each of the game machines,
   wherein each of the game machines includes:
   an obtaining device adapted and configured to transmit, when a predetermined condition is satisfied, the plan information request to the plan management server and obtain the plan information;
   a game machine time measuring device adapted and configured to start, when the plan information is obtained by the obtaining device, measuring lapse of the system time independently of the server time measuring device;
   a stage determining device adapted and configured to determine whether the system time has reached the process start stage or not based on the time measured by the game machine time measuring device and the remaining time indicated by the obtained plan information; and
   a process executing device adapted and configured to start, when the stage determining device determines that the system time has reached the process start stage, the process for the common event.

2. The game system according to claim 1, wherein the obtaining device transmits, when the predetermined condition is satisfied in a case where the game machine is powered on, the plan information request, and obtains the plan information.

3. The game system according to claim 1, wherein the plan information providing device of the plan management server provides to the game machine, the plan information on the one or more common events to be executed during a predetermined time since a moment of receiving the plan information request.

4. The game system according to claim 1, wherein the one or more common events include a process for the common game to be performed concurrently by the plurality of game machines.

5. The game system according to claim 1, wherein:
   each of the plurality of game machine includes an after-start stage storing device adapted and configured to store stage information on time required to reach each of a plurality of stages indicating progress of process for the common game after the system time has reached the process start stage;
   the stage determining device of the game machine determines whether or not the system time has reached any one of the stages indicating the progress of process by referring to time measured by the game machine time measuring device and the stage information after the system time has reached the process start stage; and the process executing device of the game machine performs the process for the common game associated with the stage that is determined as a reached stage by the stage determining device.

6. The game system according to claim 1, wherein:
the plan information in the plan information storing device includes stage information on time required to reach to each of a plurality of stages indicating progress for the common game after the system time has reached the process start stage;
the stage determining device of the game machine determines whether or not the system time has reached any one of the stages in the progress of process by referring to time measured by the game machine time measuring device and the stage information after the system time has reached the process start stage; and
the process executing device of the game machine performs a process for the common game associated with the stage that is determined as a reached stage by the stage determining device.

7. The game system according to claim 1, further comprising:
a lobby server that accepts participation requests for participating in the common game from the plurality of game machines, sets one of the game machines which sent the participation request as a game master of the common game, and transmits to the game machines, a participation acceptance notification including master information indicative of the game master;
wherein a plurality of stages indicating the progress of process for the common game include a reception end stage at which reception of the participation request is finished, a participation determination stage at which participation game machines to participate in the common game are determined, and an execution stage of the common game, and;
a process executing device of the game machine includes:
a participation requesting device adapted and configured to, when it is determined that the system time has reached the process start stage, in a case where a participation request operation is performed by a player within predetermined time, enable the participation request to be transmitted to the lobby server and, when it is determined that the system time has reached the reception end stage, disable transmission of the participation request;
a master determining device adapted and configured to determine whether the game machine itself is the game master or not by referring to the master information received from the lobby server;
a registration requesting device adapted and configured to transmit, when the master determining device determines that the game machine itself is not the game master, a registration request for registering the game machine itself to a game machine which is set as the game master;
a participation game machine registering device adapted and configured to receive, in a case where the master determining device determines that the game machine itself is the game master, the registration request from a game machine which is not the game master, register into participation information, a game machine corresponding to the received registration request as the participation game machine, and when the system time reaches the participation determining stage, and stop reception of the registration request to transmit the participation information to the game machines corresponding to the received registration request; and
a game executing device adapted and configured to, when it is determined that the system time has reached the execution stage, start executing the common game with other game machines registered in the participation information.

8. The game system according to claim 1, wherein the common game to be executed is a game corresponding to an actual horse race held in one year.

9. A server in which a process for one or more common events for a common game are concurrently performed in a plurality of game machines each configured to transmitting and receiving data via a communication line comprising:
a server time measuring device adapted and configured to measure lapse of system time common in a game system;
a plan information storing device adapted and configured to store plan information indicative of remaining time until the system time reaches a process start stage at which a process for each of the common events starts;
a plan information updating device adapted and configured to update the plan information stored by the plan information storing device in accordance with measurement by the server time measuring device; and
a plan information providing device adapted and configured to provide the plan information to the game machine in response to a plan information request from each of the plurality of game machines.

10. The server according to claim 9, wherein the plan information providing device provides to at least one game machine, the plan information on a plurality of common events to be executed during a predetermined time since a moment of receiving the plan information request.

11. The server according to claim 9 wherein:
at least one game machine includes an after-start stage storing device to store stage information on time required to reach each of a plurality of stages indicating progress of process for the common game after the system time has reached the process start stage;
a stage determining device of the at least one game machine determines whether the system time reaches any one of the stages indicating the progress of process by referring to time measured by a game machine time measuring device, the game machine time measuring device independently of the server time measuring device, and the stage information after the system time has reached the process start stage; and
a process executing device of the at least one game machine performs the process for the common game associated with the stage that is determined as a reached stage by the stage determining device.

12. The server according to claim 9 wherein:
the plan information in the plan information storing device includes stage information on time required to reach to each of a plurality of stages indicating progress for the common game after the system time has reached the process start stage;
a stage determining device of at least one game machine determines whether or not the system time has reached any one of the stages in the progress of process by referring to time measured by a game machine time measuring device and the stage information after the system time has reached the process start stage; and
a process executing device of the game machine performs a process for the common game associated with the stage that is determined as a reached stage by the stage determining device.

13. The server according to claim 9, further comprising:

a lobby server that accepts participation requests for participating in the common game from the plurality of game machines, sets one of the game machines which sent the participation request as a game master of the common game, and transmits to the game machines, a participation acceptance notification including master information indicative of the game master;

wherein a plurality of stages indicating the progress of process for the common game include a reception end stage at which reception of the participation request is finished, a participation determination stage at which participation game machines to participate in the common game are determined, and an execution stage of the common game; and a process executing device of the game machine comprises:

- a participation requesting device adapted and configured to, when it is determined that the system time has reached the process start stage, in a case where a participation request operation is performed by a player within predetermined time, enable the participation request to be transmitted to the lobby server and, when it is determined that the system time has reached the reception end stage, disable transmission of the participation request;
- a master determining device adapted and configured to determine whether the game machine itself is the game master or not by referring to the master information received from the lobby server;
- a registration requesting device adapted and configured to transmit, when the master determining device determines that the game machine itself is not the game master, a registration request for registering the game machine itself to a game machine which is set as the game master;
- a participation game machine registering device adapted and configured to receive, in a case where the master determining device determines that the game machine itself is the game master, the registration request from a game machine which is not the game master, register into participation information, a game machine corresponding to the received registration request as the participation game machine, and when the system time reaches the participation determining stage, and stop reception of the registration request to transmit the participation information to the game machines corresponding to the received registration request; and
- a game executing device adapted and configured to, when it is determined that the system time has reached the execution stage, start executing the common game with other game machines registered in the participation information.

14. The server according to claim 9, wherein the common game to be executed is a game corresponding to an actual horse race held in one year.

\* \* \* \* \*